United States Patent [19]

Kaar

[11] Patent Number: 4,790,166
[45] Date of Patent: Dec. 13, 1988

[54] ROUND COLLAR MAKER

[76] Inventor: Richard A. Kaar, 5151 W. 1st, Wahoo, Nebr. 68066

[21] Appl. No.: 880,874

[22] Filed: Jul. 1, 1986

Related U.S. Application Data

[63] Continuation-in-part of Ser. No. 757,722, Jul. 22, 1985, Pat. No. 4,614,102.

[51] Int. Cl.$^4$ .............. B21D 5/14; B21D 17/04
[52] U.S. Cl. ..................... 72/106; 72/105; 72/109; 72/125; 72/179
[58] Field of Search ............... 72/105–109, 72/111, 125, 179, 182

[56] References Cited

U.S. PATENT DOCUMENTS

| 14,738 | 4/1856 | Shepard et al. | 72/182 |
|---|---|---|---|
| 306,562 | 10/1884 | Vincent | 72/179 |
| 469,763 | 3/1892 | Williams | 72/179 |
| 595,287 | 12/1897 | Carlstedt | 72/179 |
| 1,186,145 | 6/1916 | Stowe | 72/106 |
| 1,767,755 | 6/1930 | Grotnes | 72/109 |
| 1,822,697 | 9/1931 | Hahnemann | 72/105 |
| 1,850,958 | 3/1932 | Horvath | 72/105 |
| 2,024,803 | 12/1935 | Nelson | 72/105 |
| 2,165,282 | 7/1939 | Loggins | 72/179 |
| 2,364,735 | 12/1944 | McGlone et al. | 72/179 |
| 4,018,072 | 4/1977 | Davis | 72/106 |

FOREIGN PATENT DOCUMENTS

| 709343 | 8/1931 | France | 72/105 |
|---|---|---|---|
| 192350 | 6/1923 | United Kingdom | 72/179 |

Primary Examiner—Lowell A. Larson

[57] ABSTRACT

A round collar maker having as one of its sections a conventional combination rotary machine, the collar maker having a pair of rollers on axles of the machine and having a guide provided with a cylindrical circumference which latter is arranged about an axis offset to one side of the axes of the shafts. The guide has an exterior portion having a cylindrical exterior rotating about a guide support which is cylindrical and horizontally elongated. The support is held on a support carrier which is attachable to the spindle of the machine. The rollers are reversible and are shaped so as to be useable, also, as rollers for a seam lock spreader which uses the same combination rotary machine as one of its sections.

2 Claims, 1 Drawing Sheet

ROUND COLLAR MAKER

BACKGROUND OF THE INVENTION

In the prior art, combination rotary machines for sheet metal bending have long been in use. They comprise upper and lower shafts on which various kinds of rollers are mounted for many different uses.

Although many thousands of such machines have been in use, yet no way has been found in the prior art to use them for making round starting collars.

A starting collar is a circular protrusion or collar extending from a cylindrical pipe about its circumference and spaced from a terminal end thereof. When that terminal end is inserted through a sheet metal wall, the portion of the inserted duct which protrudes beyond the wall is then bent back against the inner side of the wall to hold the wall securely between bent-back ears of the duct and the collar.

Such walls frequently have insulation on their inner sides so that the tabs must be long enough to grip the inner side of the insulation. As insulation can vary in thickness, it is an object hereof to provide a machine which can make the collar at a gauged selected distance from the end of the cylindrical duct.

In round collar making without the guide roller hereof, the work piece is placed between the main rollers, but as the rollers are rotated the cylindrical workpiece becomes distorted because of the tendency of the metal going between the rollers to continue in a straight line.

This distortion causes it to be difficult to fit the distorted work piece into the circular hole in another piece of metal and much time is consumed in cramming them in.

So one objective hereof is to eliminate this waste cramming labor by providing the concept of placing a guide roller in addition to two collar-making rollers on a combination rotary machine for making collars thereon that are truly cylindrical and that will fit into circular holes speedily.

Another objective is to provide for the double use of the two rollers, and of the combination rotary machine, not only for round collar making but also for lock seam opening.

IN THE DRAWINGS

DESCRIPTION OF THE PREFERRED EMBODIMENT

Figure 1:
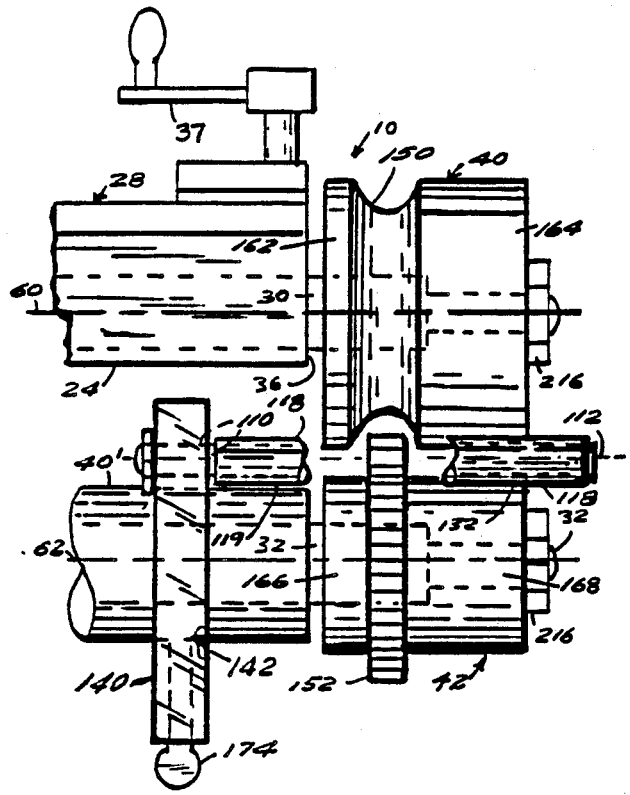
FIG. 1 shows a side elevation of a portion of a combination rotary machine shown with rollers hereof and guide hereof thereon for round starting collar making.

The round collar maker 10 of this invention has as one of its parts a combination rotary machine 28 having a crank 37 a main frame 24, upper and lower shafts 30 and 32, rotatably mounted on and projecting to one side 36 of the main frame 24.

The shafts 30 and 32 are adjustably vertically spaced by a crank 37.

A spindle 40' prime surrounds the said lower shaft 32. A crank handle is on the frame 24 and is capable of causing rotation of at least one of the said shafts 30 and 32.

Upper and lower main rollers 40 and 42 are on the shafts 30 and 32 respectively and the main rollers 40 and 42 rotate in opposite directions about upper and lower axes 60 and 62.

The guide module 100 can be seen to have a guide idler or sleeve idler or guide 118 having an outer cylindrical surface 119.

The guide 118 is capable of being engaged by the work-piece 188 at any instant during guiding of the workpiece. The guide 118 is freely rotatable about an axle 110 which has a guide axis 119 parallel to the axis 60 and 62 of the upper and lower main rollers respectively.

The guide 118 has, at all guiding times, a guide-surface 132, engaged by the workpiece 188, and a part of the cylindrical surface 119.

Figure 3:
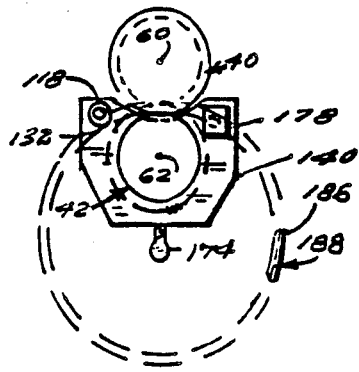
FIG. 3 shows a diagrammatic view of the machine of FIG. 1 as seen from the roller end of the machine, some parts of the machine being broken away. The position of work piece is shown in dotted lines.
Figure 4:
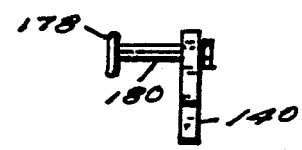
FIG. 4 is a view of stop shown as seen from the opposite side of the round collar maker as FIG. 1.

The guiding surface 132 faces downward toward the level of the axis 62 therebeneath and is disposed beneath the top level of the outer surface of the roller 42, as shown in FIG. 3 and is elongated in parallelism with the axes 60 and 62 and so is disposed at a level for causing sheet metal, passing between the rollers 40 and 42 against the guiding surface 132, to be deflected into a greater curvature.

This causes the circular vertical cross-sectional shape of a workpiece ring to be deflected back toward circular shape after it has been distorted so as to be more straight by it's passing between the rollers 40 and 42.

The sleeve idler 118 of the guide rotates freely around the axle 110.

The guide idler 118 has one end fixed to a guide carrier 140 which has an opening 142 receiving the spindle 40' and fixable thereto in various positions farther from or closer to the rollers 40 and 42.

The upper roller 40 has a circumferential groove 150 receiving a circumferential ridge 152 in the lower roller 42.

Each roller has one or more opposed work-piece metal driving portions and two are shown at 162 and 164 on the upper roller 40 on each side of the groove 150; two others are shown at 166 and 168 on each side of the ridge 152 of the lower roller 42.

The work-piece metal driving portions 162, 164, 166 and 168 are cylindrical about their respective axes, and, when the collar maker has its shaft spacing adjusted by the crank 37, then the rollers are properly spaced for workpiece wall thickness and the driving portions 162, 164, 166 and 168 will drive the work-piece through the rollers.

The guide carrier 140 is adjustable along the spindle 40 with a setscrew 174.

Figure 5:
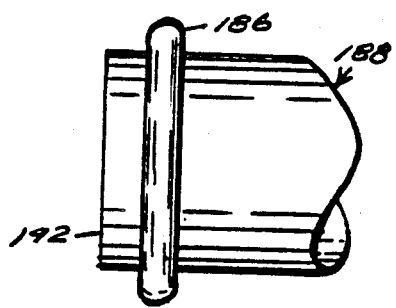
FIG. 5 shows a round pipe with its circumferential protrusion or collar.

A stop 178 is mounted on the carrier 140 by a bar 180 and the position of the carrier 140 on the spindle 40' sets the position of the stop 178 so as to position the outward corrugation or collar 186 to be made in a work piece 188 of FIGS. 3 and 5 at a desired distance from the end 192 of the workpiece 188.

Figure 2:
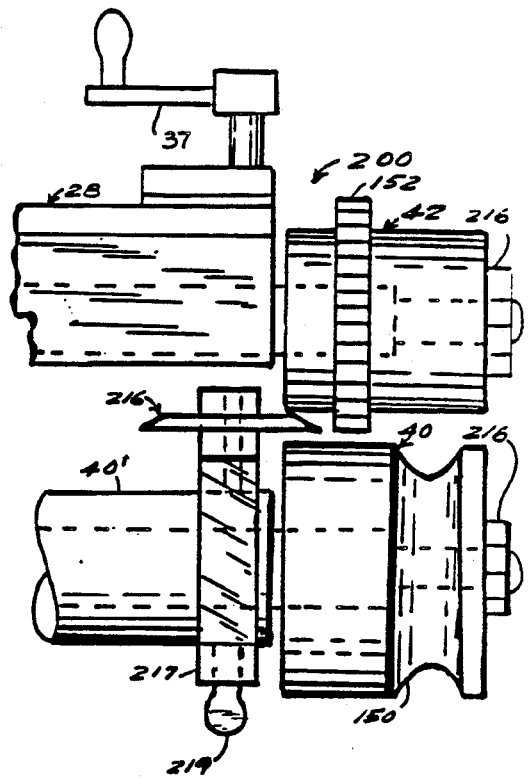
FIG. 2 shows a side elevation of the same portion of the same combination rotary machine as FIG. 1 but connected to be a lock seam opener.
Figure 6:
FIG. 6 shows a cross-section of a workpiece with a seam which has been spread upwardly by the lock seam opener hereof, a portion of an opening disc being shown.

In FIG. 2 is a side elevation of a forward portion of a combination rotary machine 28 shown as converted to become a lock seam spreader 200 substantially as shown in the parent patent application 757,722. Since the operation of the lock seam spreader 200 is shown and described in the parent application it is not repeated here. But as a workpiece 210 partially shown in FIG. 6 travels past a rotating opener disc 216 its seam is pryed open into the shape shown in FIG. 6. Nuts 216 of FIGS. 1 and 2 permit removal of the rollers 40 and 42 and their reversal to the FIG. 2 positions.

The disc 216 is on a disc carrier 217 adjustable along the spindle 40' by a set-screw 219.

I claim:

1. A round collar maker comprising: a combination rotary machine having: a main frame, upper and lower parallel shafts rotatably mounted on and projecting to one side of said main frame, drive means causing rotation of at least one of said shafts, upper and lower main rollers on said shafts respectively whereby said main rollers rotate in opposite directions about upper and lower axes, said rollers having opposed metal-driving portions, said opposed portions being closely spaced for pressing against a workpiece of sheet metal passing therebetween during roller rotation, one of said rollers having a circumferential groove and the other roller having a circumferential ridge protruding into said groove, a guide rotatable about its axis parallel to said axes, means mounting said guide on said machine, said guide having a guiding surface elongated in parallelism with said axes and disposed in a position spaced horizontally from one side of said rollers and closely adjacent to said opposed portions of said rollers and capable of causing sheet metal passing said rollers and guided by said guiding surface to be deflected into a cylindrical shape, a stop, said machine having a horizontally extending projecting spindle having a substantially cylindrical outer surface, said guide being mounted on said spindle, a carrier means attaching said stop to said spindle, said carrier means being attached to said spindle in an adjustable manner axially along said spindle for varying the position of said stop with respect to said rollers.

2. The round collar maker of claim 1 wherein said means mounting said guide on said machine comprises having said guide mounted on said carrier means.

* * * * *